United States Patent [19]

Stuart et al.

[11] Patent Number: 5,440,100

[45] Date of Patent: * Aug. 8, 1995

[54] TIPS AND DIFFUSERS FOR MIG WELDING GUNS

[75] Inventors: Kyle H. Stuart; Dale R. Bervig, both of Wichita, Kans.

[73] Assignee: Tweco Products, Inc., Wichita, Kans.

[ * ] Notice: The portion of the term of this patent subsequent to Aug. 16, 2011 has been disclaimed.

[21] Appl. No.: 121,304

[22] Filed: Sep. 14, 1993

Related U.S. Application Data

[63] Continuation-in-part of Ser. No. 843,322, Feb. 26, 1992, Pat. No. 5,338,917.

[51] Int. Cl.$^6$ .............................................. B23K 9/173
[52] U.S. Cl. ............................ 219/137.31; 219/137.61
[58] Field of Search ....................... 219/137.42, 137.61

[56] References Cited

U.S. PATENT DOCUMENTS

| | | | |
|---|---|---|---|
| 2,797,301 | 6/1957 | Copleston | 219/75 |
| 3,283,121 | 11/1965 | Bernard | 219/130 |
| 3,428,778 | 2/1969 | Blackman | 219/130 |
| 3,469,070 | 9/1969 | Bernard et al. | 219/137.42 |
| 3,514,570 | 5/1970 | Bernard | 219/130 |
| 3,544,758 | 12/1970 | dal Molin | 219/130 |
| 3,689,733 | 9/1972 | Matasovic | 219/130 |
| 3,909,585 | 9/1975 | Sanders | 219/130 |
| 4,250,366 | 2/1981 | Erickson | 208/157 |
| 4,268,740 | 5/1981 | Sanders | 219/137 |
| 4,282,419 | 8/1981 | Auer | 219/137 |
| 4,297,561 | 10/1981 | Townsend | 219/137 |
| 4,361,747 | 11/1983 | Torrani | 219/75 |
| 4,544,827 | 10/1985 | Cusick, III | 219/137 |
| 4,554,432 | 11/1985 | Raloff | 219/137 |
| 4,560,858 | 12/1986 | Manning | 219/137 |
| 4,695,702 | 9/1987 | Gartland | 219/137 |
| 4,702,539 | 10/1987 | Cusick, III | 439/588 |
| 4,791,266 | 12/1988 | Gerard | 219/121 |
| 4,864,099 | 9/1989 | Cusick, III | 219/137 |
| 4,937,428 | 6/1990 | Yoshwaka | 219/137 |
| 5,338,917 | 8/1994 | Stuart et al. | 219/137.61 |

OTHER PUBLICATIONS

Bernard advertising brochure entitled "Bernard's Guide to Welding Guns" dated 1967.
Benzel MIG Equipment Parts Catalogue Consumables; pp. 84–88.
"Kabelmetal Akliengesellschaft copper alloy hardness graph".

Primary Examiner—Clifford C. Shaw
Attorney, Agent, or Firm—Herzog, Crebs & McGhee

[57] ABSTRACT

Contact tips and diffusers, known as consumables, for MIG welding guns have a combined increase in mass over the prior art. The larger combined mass of the contact tips and diffusers, coupled with a three point thermal and electrical engagement, increase the life of the tips by a factor of between 2 and 6 times the prior art. The contact tip and diffuser engage; i) between a circumferential shoulder of the contact tip and the end of the circumferential opening of the lower interior chamber of the gas diffuser; ii) between the protrusion of the gas diffuser and a point on the circumferential channel of the contact tip; and iii) between a line on the contact tip opposite the protrusion of the gas diffuser and a line on an inner surface of the second interior chamber of the gas diffuser opposite the protrusion. A cam replaces prior art threads. The camming action is produced by a circumferential channel cut into the contact tip that intersects with a tangential flat in one end of the contact tip and which decreases in width and depth around to a point 180° from the tangential flat. As the contact tip is rotated, the protrusion tracks within the channel to axially and radially wedge the contact tip within the diffuser.

21 Claims, 10 Drawing Sheets

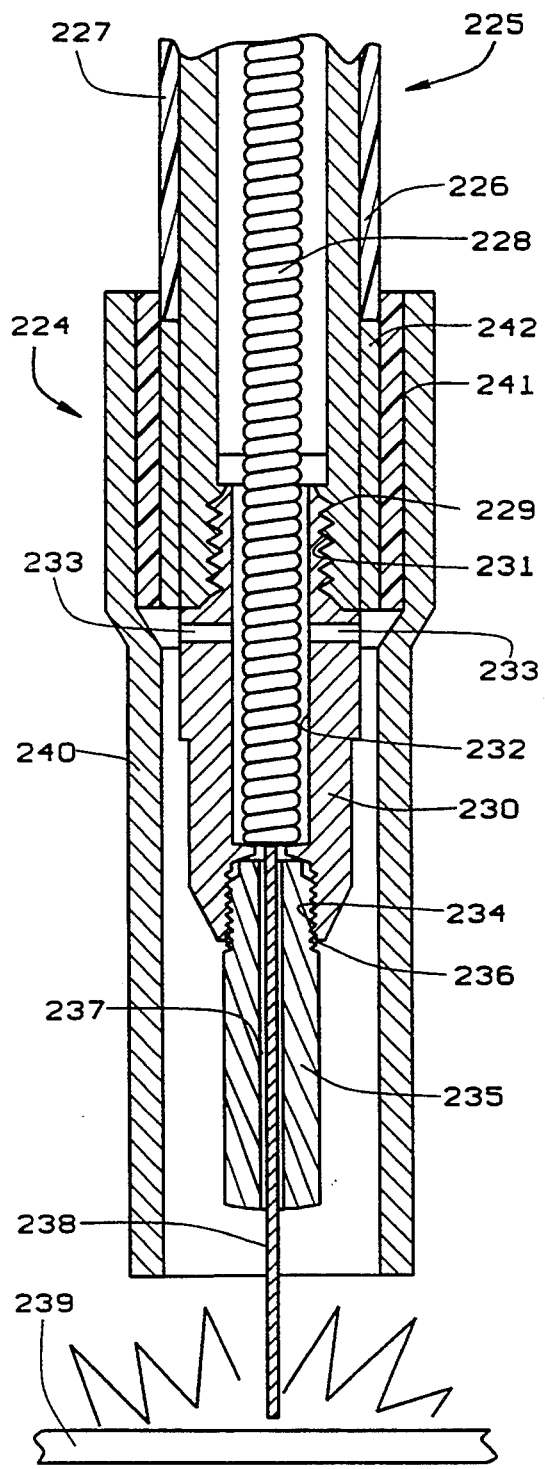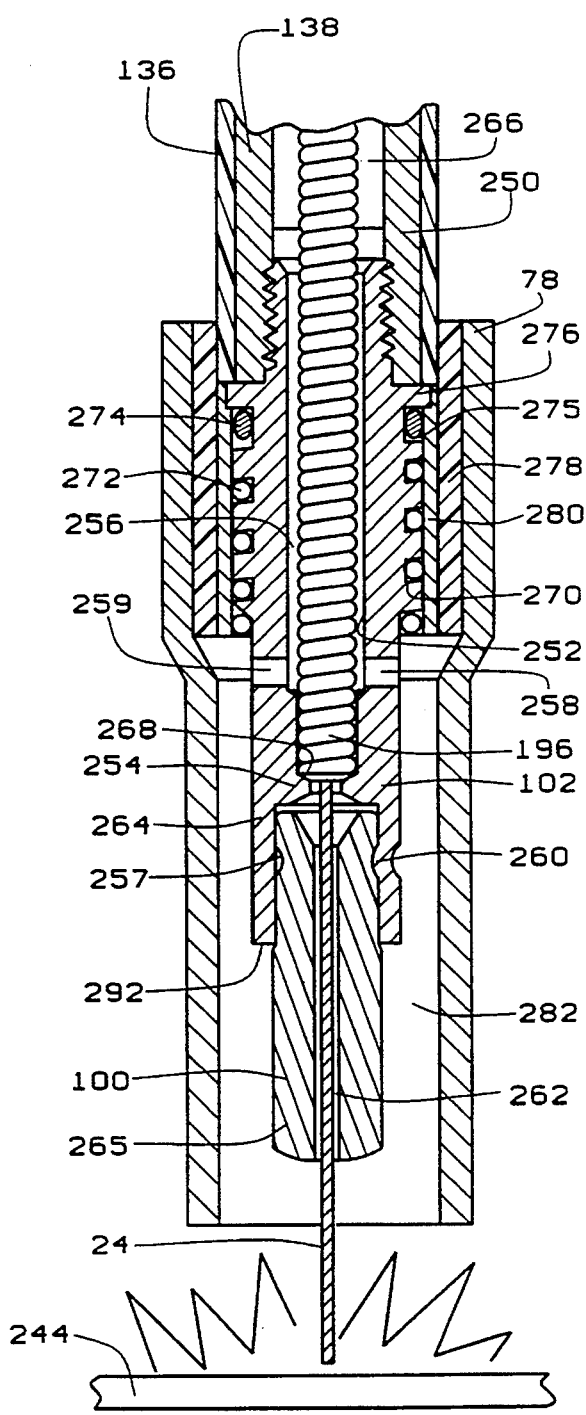
FIG. 7
PRIOR ART
FIG. 8

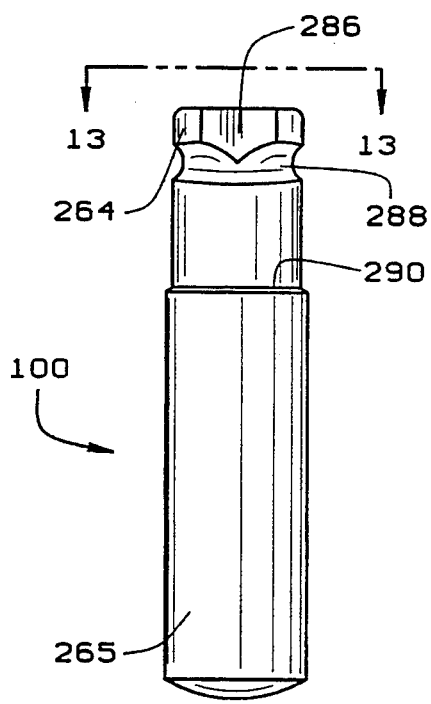
FIG. 12
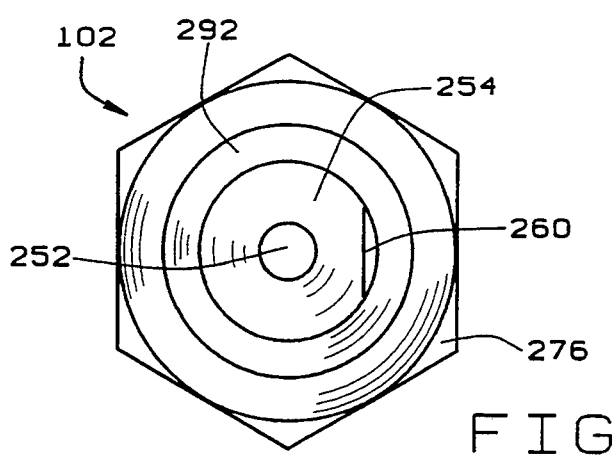
FIG. 13
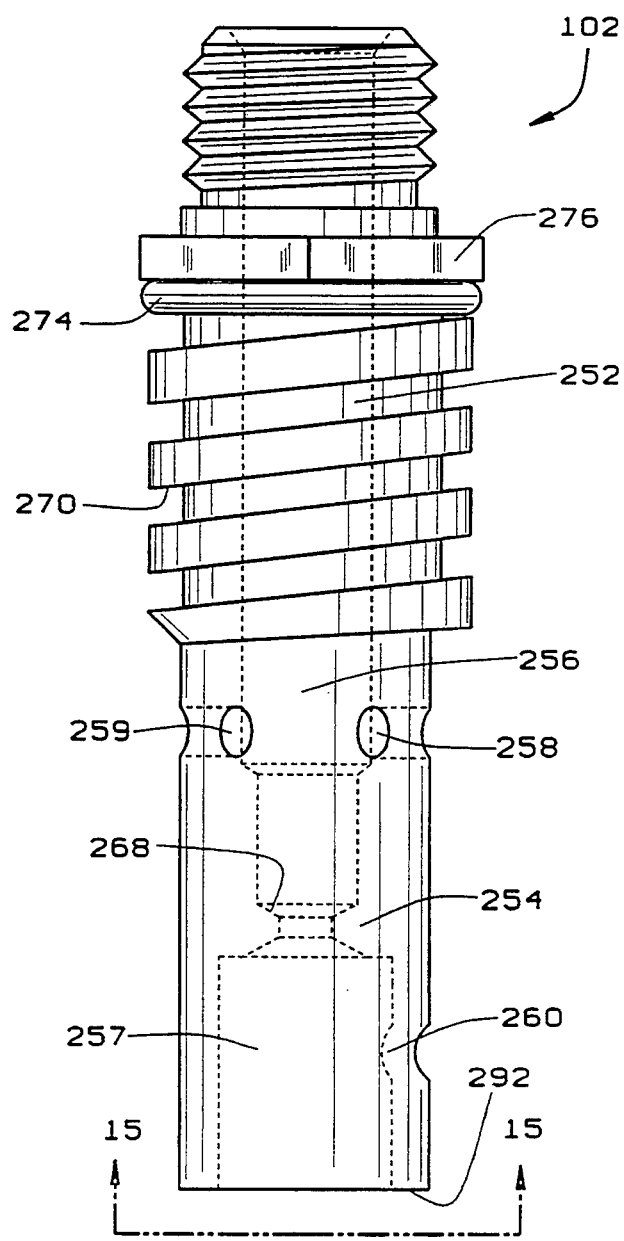
FIG. 14
FIG. 15

TIPS AND DIFFUSERS FOR MIG WELDING GUNS

CROSS-REFERENCE TO RELATED APPLICATIONS

This application is a Continuation-In-Part of patent application Ser. No. 07/843,322 filed Feb. 26, 1992, now U.S. Pat. No. 5,338,917, entitled Ergonomic Welding Gun with Quick Disconnect Assembly by Kyle Howard Stuart and Dale R. Bervig, Ph.D.

BACKGROUND OF THE INVENTION

1. Field of the Invention

The present invention relates generally to Gas Metal Arc Welding (GMAW) or Metal Inert Gas (MIG) welding and, more particularly, to consumable parts for MIG systems, the consumable part otherwise known as contact tips and diffusers.

In MIG type welding a welding wire is utilized to provide a molten metal pool in order to join the metal pieces together. The welding wire in a MIG system is typically protected from atmospheric contamination by a blanket of shield gas. The shield gas is an inert gas or a combination of inert gas plus other gases. MIG welding systems utilize a continuous welding wire that is rolled onto a spool and fed through coaxial welding cable to the welding gun. Because of the continuous welding wire, MIG welding systems are generally faster than Tungsten Inert Gas (TIG) systems or conventional stick welding systems that utilize individual welding rods.

2. Description of the Prior Art

MIG welding systems have been widely used in the United States and other places around the world since at least the 1960's. The present invention is an improvement over these conventional MIG welding systems. The present invention includes improved contact tips and gas diffusers for several types and amperages of MIG welding guns.

An Information Disclosure Statement has been filed concurrently herewith and includes a discussion of the prior art. Some of the individual features found on the present invention can be found in the prior art. For example, on feature, cylindrical contact tips, are well known. However, Applicants believe that some of the individual features are unique. It is common to offer MIG welding guns with various amperage ratings. For example, it is contemplated that embodiments of the present invention will initially be offered in 250 amps., 450 amps., and 600 amps.

There has been a long felt need in the welding industry to increase the operating life of MIG type contact tips. Those skilled in the art will recognize that welding produces a lot of heat. In order to melt the welding wire, the arc point will sometimes reach 10,000° F. (5,000° C.) or more. The molten pool of metal beneath the arc, though cooler, may sometimes reach 5,000° F. (2,760° C.) or more. The contact tip which is typically less than one inch (2.54 cm) away from the arc point may operate at temperatures of approximately 1500° F. (815° C.). Contact tips are typically formed from copper alloys which are adversely effected by high temperatures. Contact tips are also subject to wear because the welding wire feeds through the interior thereof. Contact tips tend to wear out relatively quickly and therefore are replaced many times during the life of a MIG welding gun. Because the tips are replaced so often they are referred to as "consumables" in the industry. The present invention allows the new contact tip to operate at substantially cooler temperatures which is believed to lengthen the overall life of the tip; however, it will still need to be replaced, though not as often.

SUMMARY OF THE INVENTION

The present invention provides improved contact tips and diffusers that extend the operating life of the contact tips by a factor of 2 to 6 times the prior art.

In every embodiment the contact tip and diffuser are believed to be more massive than prior art designs. The larger overall size contributes to more efficient transmission of electricity and dissipation of heat. The contact tip and diffuser are believed to have a larger overall contact area than prior art devices which also allows for more efficient transmission of electricity and dissipation of heat. The present invention makes contact between the diffuser and the contact tip at three points, namely: 1) along a circumferential shoulder formed on the contact tip and an end of the diffuser where the contact tip is inserted; 2) at a point between a protrusion in the diffuser and a channel in the contact tip; and 3) on a line opposite the protrusion. If the contact tip can be operated at cooler temperatures, it should result in longer life for the contact tip and the gas diffuser. Longer tip life means less downtime.

The contact tip of the present invention includes a tangential flat disposed on one end of the contact tip and a circumferential channel in the outer circumference or periphery thereof that intersects the tangential flat. The tangential flat and the circumferential channel cooperate with a radially inwardly extending protrusion on the inner circumference of the gas diffuser such that as the contact tip is inserted into the gas diffuser the flat allows the contact tip to pass by the protrusion. As the contact tip is rotated within the diffuser, the tip becomes wedged therein.

The channel furthermore includes a first width and a first depth located at the intersection of the channel and the tangential flat into which the protrusion initially fits when the contact tip is inserted into the gas diffuser. The channel circumferentially tapers to a second width and a second depth at a point diametrically opposite the tangential flat. The second width and the second depth are respectively less than the first width and the first depth.

Thus, as the contact tip is rotated within the gas diffuser, the protrusion tracks within the channel defined by the contour thereof. Since the diffuser is stationary relative to the contact tip, the contact tip moves within the diffuser such that the contact tip is caused to axially and radially wedge within the gas diffuser due to the reduced channel width and depth during rotation. A camming action is thus defined to hold the contact tip in place without the use of threads.

The contact tip also includes an annular or circumferential shoulder that is caused to abut the end of the gas diffuser when the contact tip is placed within the diffuser. The circumferential shoulder allows a greater amount of electricity to flow from the diffuser into the contact tip to increase the performance thereof, while at the same time allowing a greater amount of heat to be dissipated back into the diffuser from the tip. These features combine to achieve better performance and longer operating life.

Furthermore, regardless of the embodiment, a minimum level of combined mass of contact tip and diffuser achieves the improved characteristics while essentially keeping within a contact tip to diffuser weight ratio range. Increasing the mass of both the contact tip and diffuser within the above constraints creates an operable life factor increase of between 2 to 6 times over the prior art.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and is therefore not to be considered limiting of its scope, for the invention may admit to other equally effective embodiments. Reference the appended drawings, wherein:

FIG. 7 is an enlarged sectional view of a prior art conductor tube assembly utilizing a prior art diffuser and contact tip in operation with a welding wire feeding through the contact tip and engaging a workpiece;

FIG. 8 is an enlarged sectional view of the conductor tube assembly of the MIG welding gun of FIG. 2 utilizing the present diffuser and contact tip in operation with a welding wire feeding through the contact tip and engaging a workpiece;

FIG. 12 is an enlarged side elevational view of the present contact tip;

FIG. 13 is a top plan view of the contact tip taken along line 13—13 of FIG. 12;

FIG. 14 is an enlarged side elevational view of the present gas diffuser;

FIG. 15 is a bottom plan view of the gas diffuser taken along line 15—15 of FIG. 10.

While the foregoing is directed to the preferred embodiment of the present invention, other and further embodiments of the invention may be devised without departing from the basic scope thereof, and the scope thereof is determined by the claims which follow.

DESCRIPTION OF THE PREFERRED EMBODIMENT

Figure 1:
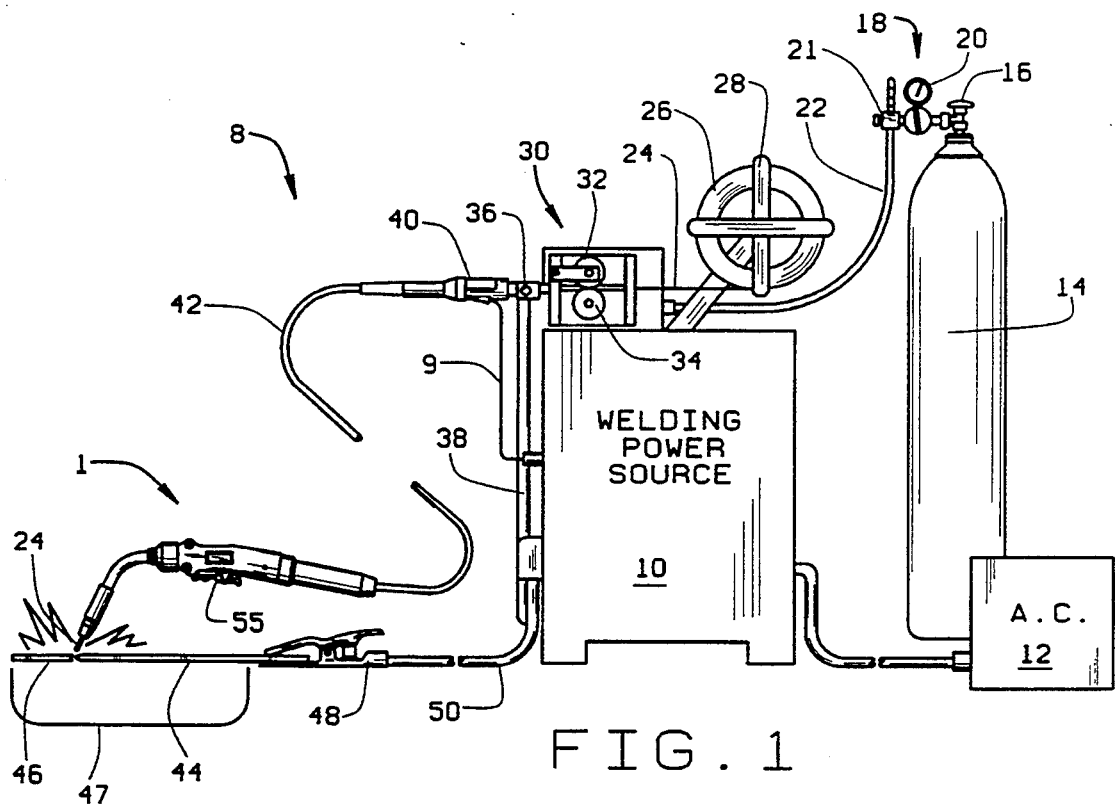
FIG. 1 is a diagrammatic representation of a typical MIG welding system.

Referring to FIG. 1, the ergonomic welding gun is generally identified by the numeral 1. The primary components of a MIG welding system which are well known to those skilled in the art, are shown in FIG. 1 and generally indicated 8. The welding power source 10 connects to an AC power supply 12 which is shown diagrammatically. In most industrial situations (in the United States), the AC power supply will either be 220 volts or 440 volts.

Also connected to the welding power source 10 is a high pressure gas cylinder 14 which typically contains an inert gas such as argon or perhaps a combination of argon and carbon dioxide. A shut-off valve 16 is attached to the high pressure cylinder 14. A regulator 18 is connected via piping to the valve 16 and typically reduces the pressure of the inert gas downstream from the regulator 18 to approximately 30 psi. A pressure gauge 20 provides a visual display of the gas pressure in the cylinder 14. A high pressure hose 22 provides fluid communication for the inert gas to the welding power source 10. The flow meter 21 is in fluid communication with the regulator 18 and the high pressure hose 22. In a typical MIG system, the inert gas flows at approximately 20 to 60 cubic feet per hour (560-1700 liters per hour).

The welding wire 24 is coiled on a spool 26. The welding wire 24 can be a copper coated ferrous wire, a stainless steel wire, a flux cored wire, etc. The spool 26 is mounted on a reel 28 which is typically positioned on top of the welding power source 10. The welding wire feeder assembly 30 advances the welding wire from the spool 26 to the welding gun 1.

The welding wire feeder assembly 30 includes two or more rollers 32 and 34 which grip the welding wire 24 and mechanically advance it from the spool 26 to the welding gun 1. An adapter 36 connects to the welding wire feed assembly 30. An electrical cable 38 runs from the welding power source 10 to the adapter 36. A rear connector 40 engages the adapter 36. In some situations, an adapter 36 is not required and the rear connector plugs directly in to the welding wire feeder assembly 30 and receives electrical power therefrom.

Control wires 9 are releasably connected on one end to the rear connector 40 and on the other end to the welding power source 10 or to the wire feeder assembly 30. The trigger 55 on the welding gun 1 actuates the welding power source 10 by closing the control circuit. Control wires run from the trigger 55 along the welding cable 42 to the control wires 9 which connect to the welding power source 10.

The coaxial welding cable 42 connects on one end to the rear connector 40 and on the other end of the welding gun 1. In this example, the workpiece 47 consists of a first plate 44 and a second plate 46 which are being welded together. A ground clamp 48 is attached to the workpiece 47 to complete the electrical circuit. A cable 50 electrically connects the welding power source 10 with the ground clamp 48.

In a typical MIG system, the workpiece is negative and the welding wire 24 is positive. The electrical circuit for a typical MIG welding system is completed as follows: The welding power source 10 connects to a cable 50 at the end of which is the ground clamp 48. The ground clamp 48 is manually attached by the welder to the workpiece 47. An electrical arc is created between the workpiece 47 and the welding wire 24 which causes the welding wire to melt into a molten pool thus joining the plats 44 and 46. The electrical current is transferred to the welding wire 24 through a contact tip, not shown in this figure, but discussed in greater detail hereinafter. The electrical current is transferred to the MIG welding gun 1, through the copper stranding 151 (see FIG. 3) in the coaxial welding cable 42 in the rear connector 40. The rear connector 40 engages the adapter 36 which is connected via the cable 38 to the welding power source to complete the electrical circuit.

The welding power source 10 will typically provide DC current to the adapter 36 which is eventually transferred to the welding gun 1. Prior to beginning a project, the operator will typically adjust voltage as determined by the workpiece and the size of the welding wire. The operator will also adjust the amperage based on the rate of welding wire feed and the size of the workpiece. The voltage controls and the amperage controls for the welding power source 10 are not shown in the drawing but are well known to those skilled in the art.

Figure 2:
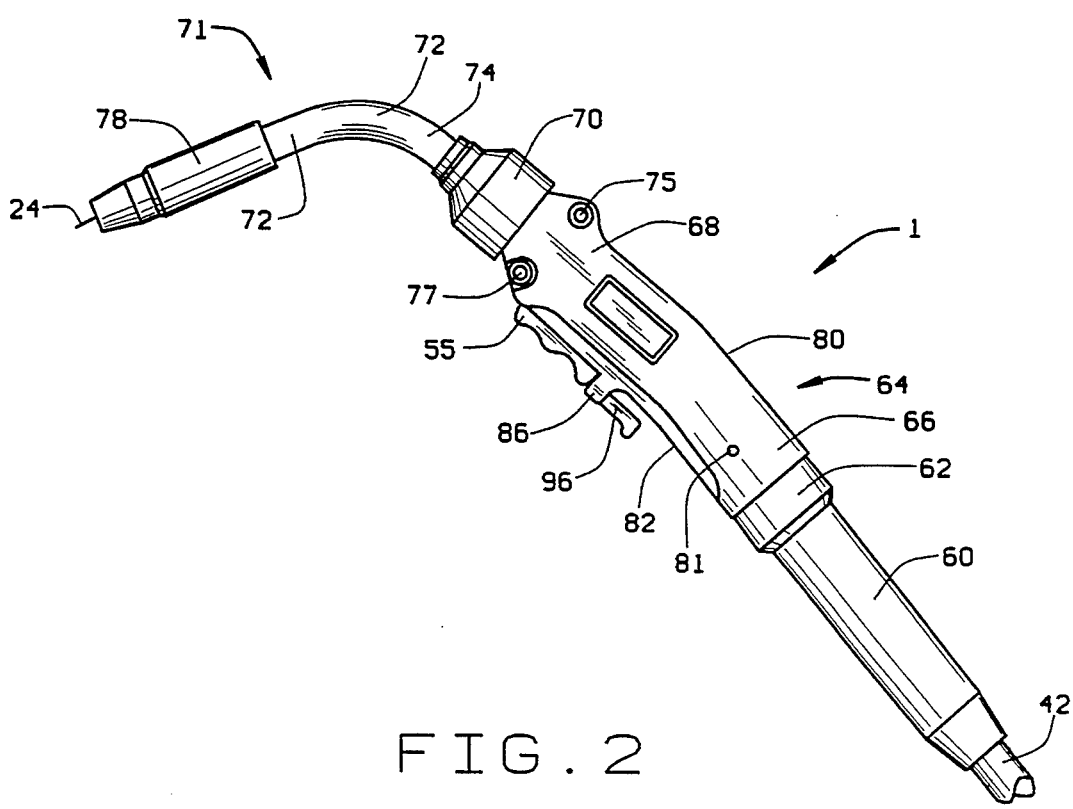
FIG. 2 is an enlarged side elevational view of a hand held MIG welding gun which utilizes the present invention.

FIG. 2 is a side elevation view of the MIG welding gun 1. The coaxial welding cable 42 feeds into a strain relief 60 which is connected by a sleeve 62 to the handle 64 of the welding gun 1. The handle 64 includes a front portion 68 and a rear portion 66.

The rear portion 66 of the welding gun handle 64 is curved downward at an angle of approximately 10° from a centerline. This gentle curve in the rear portion 66 of the handle 64 is designed to make it more comfortable to hold.

At the front portion 68 of the welding gun handle 64 is a flexible boot 70. The boot, which is typically formed from an elastomeric material, is flexible and allows the conductor tube 72 of the conductor tube assembly 71 to be readily adjusted into various positions. Adjustment of the conductor tube assembly 71 does not require any tools or disassembly of the welding gun 1. The rear portion 74 of the conductor tube 72 connects with the welding gun 1. The front portion 76 of the conductor tube 72 receives the nozzle 78. The term "conductor tube assembly" 71, as used herein, includes the conductor tube 72, the nozzle 78, the ball shaped protrusion 79 (FIG. 3), the gas diffuser 102 (FIG. 3), the contact tip 100 (FIG. 3), and the flexible boot 70.

The welding wire 24 sticks out in front of the nozzle 78 after passing through the conductor tube 72, the interior of the welding gun 1 and the coaxial welding cable 42.

The welding gun handle 64 has an upper surface 80 and a lower surface 82. Pivotally mounted in the lower surface 82 of the handle 64 is an elongated trigger 55. A first screw 75 and a second screw 77 hold the welding gun handle 64 together. The trigger assembly 84 is an elongate structure which is pivotally mounted near the front portion 68 of the handle 64. The trigger guard 86 protrudes from the lower surface 82 on both sides of the trigger 84 and is designed to reduce the risk of unintentional actuation of the trigger. In practice, welders may hold the handle 64 by the rear portion 66 or in the alternative they may grip the handle 64 near the front portion 68. The elongate trigger 84 is strategically positioned so that it may be easily actuated regardless of where the welder is holding the handle 64.

The handle 64 can be compression molded into two halves, a right half (not numbered) and a left half (not numbered) that fit together and are held together by screws 75 and 77 or other suitable fastening means. The upper surface 80 of the handle 64 is generally oval shaped. The lower surface 82 protrudes from the handle and is generally rectangular shaped to provide a gripping surface for the operator's fingers. A hole 81 is formed in one half of the handle 64. The hole 81 allows an allen wrench to pass through the handle 64 to tighten or untighten an allen head screw (not shown) in the first cable connector. The hole 81 and the allen head screw (not shown) in the handle 64 are a necessary feature which allows the welding cable 42 to be removed from the welding gun, without complete disassembly of the unified handle assembly.

The conductor tube 72 can be rotated 360° about the front of the welding gun. Rotation of the conductor tube can be manually accomplished by the welder without resort to tools or other special apparatus. If a production line welder is experiencing fatigue from having to repeatedly weld a product in a certain angular position, he can easily and quickly rotate the conductor tube assembly 71 in one direction or the other.

The conductor tube 72 and the nozzle 78 can also be articulated up and approximately 15° from a centerline (not shown) of the handle 64. Again, if the production line welder is experiencing fatigue from repetitive welding operations, he can easily and quickly without the need of tools, articulate the conductor tube assembly 71 up or down or side to side, as shown in the following figures.

Furthermore, the conductor tube 72 and the nozzle 78 can be articulated approximately 15° to the left or to the right of the centerline of the welding gun handle 64. Also, the conductor tube 72 and the nozzle 78 can be articulated approximately 15° to the left or to the right of the centerline of the handle 64. The conductor tube assembly 71 can be articulated to any desired position in a conical area radiating from the front of the welding gun 1. This conical area is approximately 15° wide as measured from the centerline of the handle 64.

Figure 3:
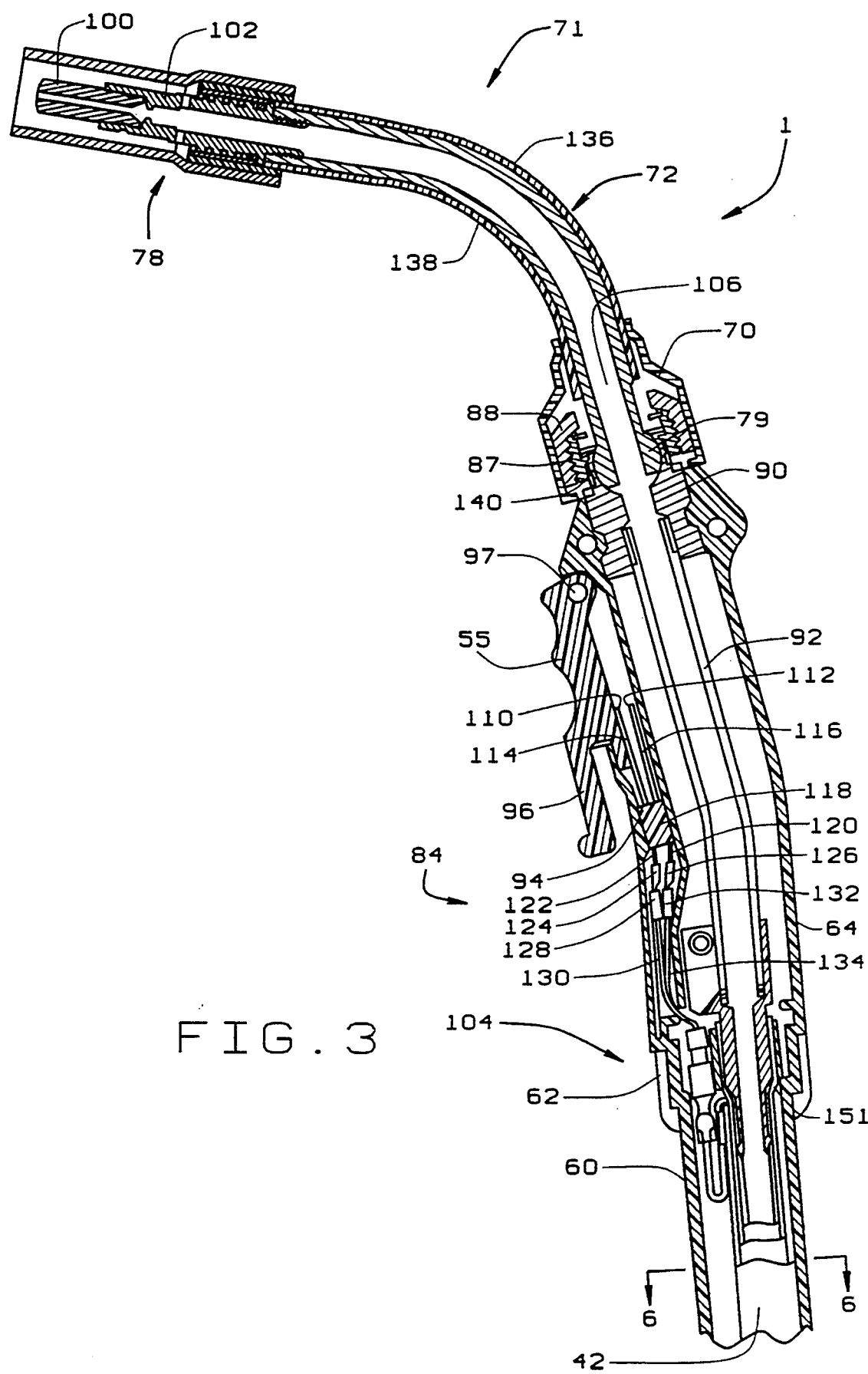
FIG. 3 is a sectional view of the MIG welding gun and conductor tube assembly depicted in FIG. 2.

FIG. 3 is a section view of the MIG welding gun 1. The unitary handle assembly is generally identified by the numeral 84. The term "unitary handle assembly" 84, as used herein, includes the left half and the right half of the handle 64, the screws 75 and 77, or other suitable fastening means, a wave washer assembly 87, nut 88, the connector block 90, the connector tube 92, the trigger 55, the trigger switch 94 and associated wiring and connectors.

The coaxial cable 42 is supported by the strain relief 60 which is connected by the sleeve 62 to the welding gun handle 64. The flexible boot 70 engages the front portion 68 of the handle 64. The conductor tube assembly 71 can be adjustably positioned by the operator to reduce fatigue and to weld hard to reach locations. Angular adjustment of the conductor tube assembly 71 is quickly accomplished by the welder without the need of tools. The elongate trigger portion 96 is pivotally mounted by a pin (not shown) to the welding gun handle 64. A bore 97 is formed in the end of the trigger 84 to receive the aforementioned pin.

A first cable connector assembly, generally identified by the numeral 104, connects one end of the coaxial cable 42 to the welding gun 1. A second cable connector assembly (not shown) connects the other end of the coaxial cable 42 to the rear connector 40. The first cable connector assembly 104 and the second cable connector assembly are substantially the same and therefore can be interchangeably connected to either the welding gun 1 or the rear connector 40.

The conductor tube 72 is adjustably attached by a ball and socket joint generally identified by the numeral 106 to the welding gun 1. The wave washer assembly 87 applies pressure to the ball and socket joint 106, thus holding the conductor tube 72 in a fixed but readily adjustable position. The connector block 90 is positioned in the front portion 68 of the handle 64. A connector tube 92 runs from the connector block 90 to the rear portion 66 of the handle 64. The first cable connector assembly 104 is releasibly connected to one end of the connector tube 92.

The trigger switch, generally identified by the numeral 94 is actuated by depressing the elongate trigger 96 towards the lower surface 82 of the handle 64 of the welding gun 1. The trigger switch 94 is shown in the off position in this figure. (The circuit is open.) When the elongate trigger 96 is depressed a first electrical contact 110 is forced into electrical contact with a second electrical contact 112, thus closing the control circuit. When the control circuit is closed, the welding power supply 10 provides electricity, welding gas and welding wire to the welding gun 1. The contacts 110 and 112 are mounted on flexible fingers, respectively 114 and 116, which are secured to a base 118. Control wire 120 is connected to the flexible finger 116. A second control wire 122 is connected to the flexible finger 114. The control wire 122 connects to a male terminal 124. The control wire 120 connects to a male terminal 126. The male terminal 124 is releasibly connected to a female terminal 128 which connects to a control wire 130 which runs the length of the coaxial welding cable 42. The male terminal 126 releasibly connects to a female terminal 132 which connects to a control wire 134 which also runs the length of the coaxial welding cable 42.

The conductor tube 72 includes an outer insulating surface 136 and a rigid interior tube 138 which is electrically conductive. On one end of the rigid interior tube 138 is a ball shaped protrusion 79 which is sized and arranged to engage and rotate in the spherical socket 140 of the connector block 90. The wave washer assembly 87 is a means for applying pressure to the ball shaped protrusion 79 and the connector block 90 to allow the conductor tube 72 to rotate 360° about the centerline of the handle 64 and to articulate approximately 15° or more in a conical area extending from the front end 192 of the connector block 90. The wave washer assembly 87 exerts spring pressure on the follower (not shown) which exerts force against the ball shaped protrusion 79 allowing the conductor tube 72 to be rotated 360° about the centerline of the handle and to be articulated approximately 15° or more up and down and side to side in a generally conical area extending from the front end of the connector block 90.

Figure 9:
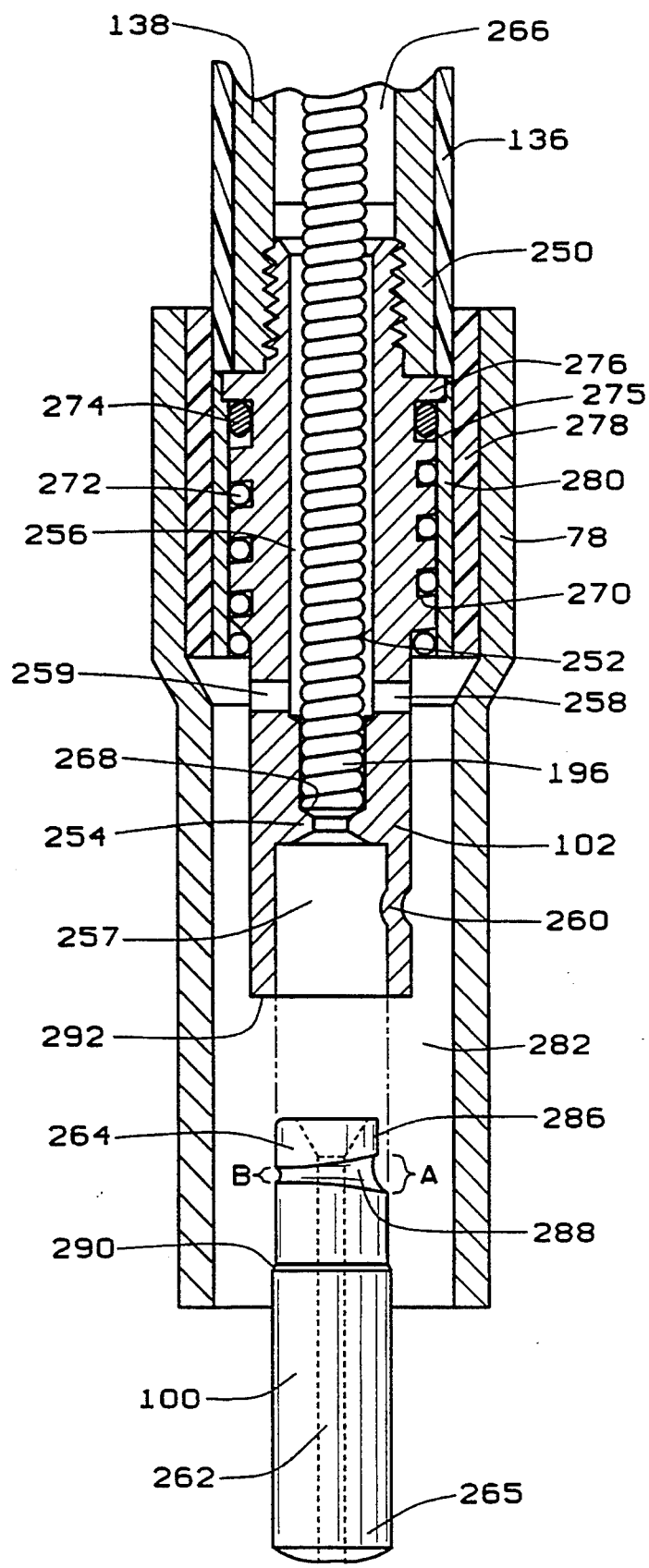
FIG. 9 is an enlarged sectional view of the conductor tube assembly of FIG. 8, except the contact tip has been disconnected and removed from the diffuser.

MIG gun 1 depicted in FIGS. 2 and 3 is generally designed to operate at 450 amperes and 600 amperes. The contact tip and diffuser utilized in MIG gun 1, and described in detail below with reference to FIGS. 8 and 9 are thus designed to operate at the same amperages.

Figure 4:
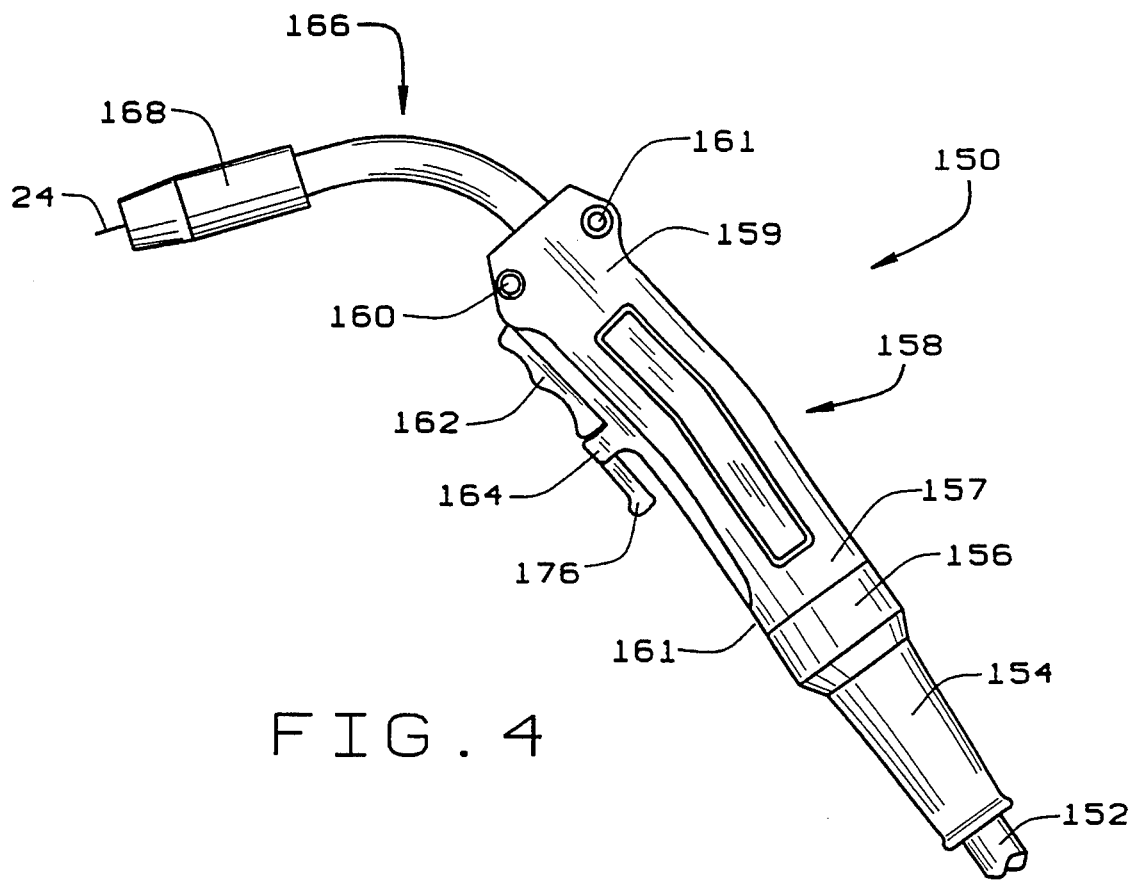
FIG. 4 is an enlarged side elevational view of an alternative embodiment of a hand held MIG welding gun which utilizes the present intention.

Referring now to FIG. 4, there is shown an alternative embodiment here designated 150 of the MIG gun 1 of FIGS. 1 and 2. MIG gun 150 is generally designed to operate below the 350 amp range and thus is an overall generally smaller MIG gun than the MIG gun 1 of FIGS. 2 and 3. Thus, as described below the contact tip and diffuser of MIG gun 150 of FIGS. 4 and 5 are each smaller than the contact tip and diffuser of MIG gun 1 of FIGS. 2 and 3.

The smaller MIG gun 150 of FIG. 4 includes a welding cable 152 which like welding cable 42 of FIG. 2, connects to the appropriate welding power source. Welding cable 152 fits into a strain relief 154 which in turn extends into a sleeve 156. Sleeve 156 is disposed on a rear portion 157 of handle 158. Handle 158 is, like handle 64 of MIG gun 1, is generally compression molded into two pieces, a left half (not numbered) and a right half (not numbered). The two pieces are held together by two screws 160 and 161, or other suitable fastening means. Disposed on an underside 161 of handle 158 is a trigger 162 with a trigger guard 164. Analogous to MIG gun 1, trigger 162 starts and stops the flow of electricity into the MIG gun for welding.

Dispose on a front portion 159 of handle 158 is a conductor tube assembly 166 which terminates in a nozzle assembly 168. Emanating from nozzle 168 is the welding wire 24.

Figure 5:
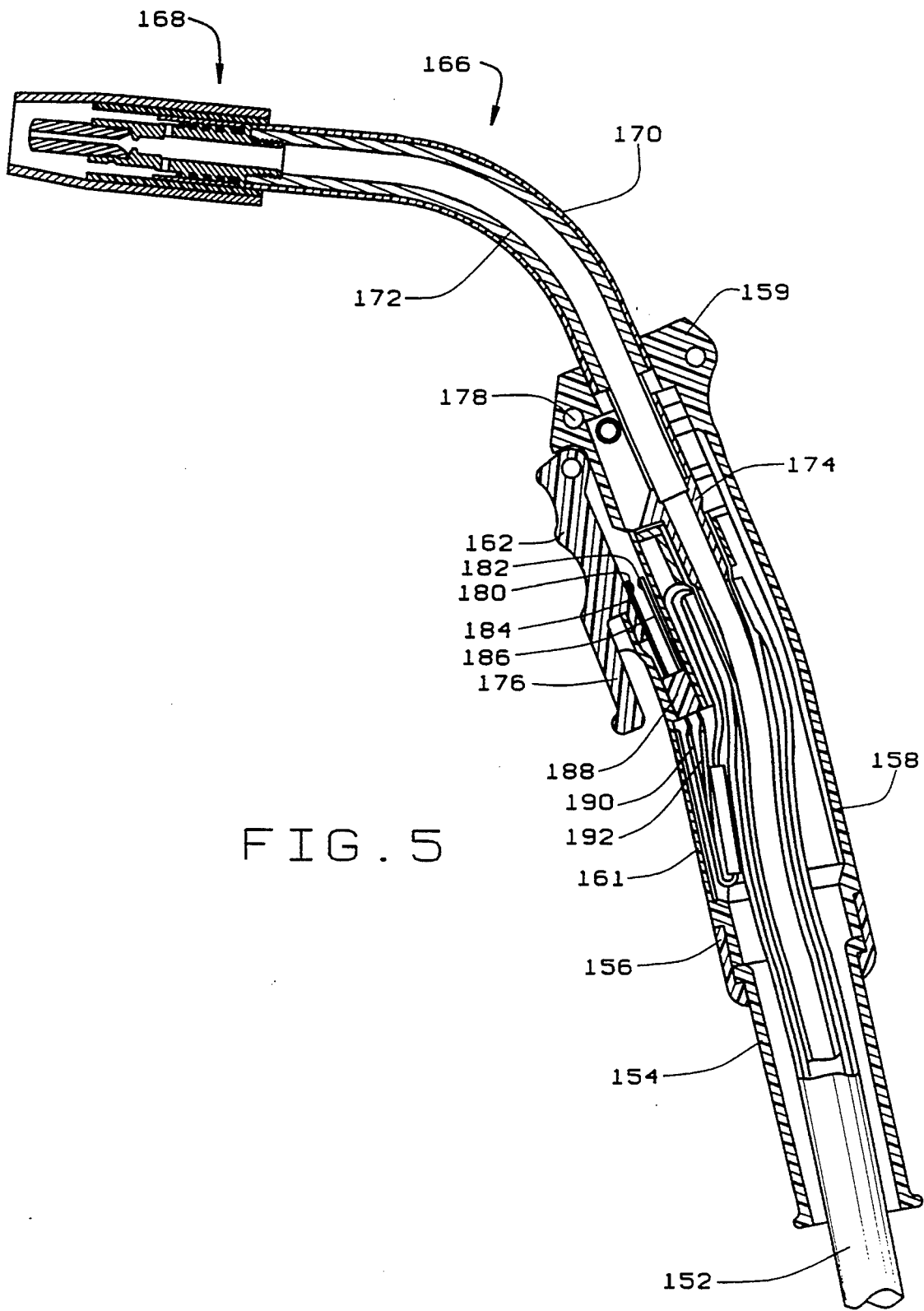
FIG. 5 is a sectional view of the MIG welding gun and conductor tube assembly depicted in FIG. 4.

Referring now to FIG. 5, the MIG gun 150 of FIG. 4 is shown in a section view. The internal components of MIG gun 150 are nearly identical in form, function and operation of MIG gun 1 of FIGS. 2-3 except for the non-swivelability of the conductor tube assembly of MIG gun 150.

The conductor tube assembly 166 includes an outer insulating tube 170 and a rigid interior tube 172 which extends into front portion 159 of handle 158 and into a holder 174. On the other end of rigid interior tube 172 is removably mounted nozzle assembly 168 similar to the nozzle assembly 78 of MIG gun of 1, and will be described in detail hereinbelow. Disposed on the underside 161 of handle 158 is trigger 162 having an elongated trigger portion 176. Trigger 162 is pivotably mounted at 178 such that depressing trigger portion 176 causes trigger 162 to make and break contact for operation of MIG gun 150. Disposed within handle 158 adjacent 162 are two contacts 180 and 182 which are respectively attached to two flexible fingers 184 and 186. Flexible fingers 184 and 186 emanate from a control block 188 and are respectively connected to leads 190 and 192 which extend through the length of welding cable 152 and back into the respective welding power source. Thus, as trigger portion 176 is depressed causing trigger 162 to pivot about pivot 178, contacts 180 and 182 are caused to join, thus completing the circuit and allowing current, gas and wire to flow, or feed, for operation of the welding gun in the same manner as MIG gun 1. It should be appreciated that in FIG. 5, the contacts are shown in the open circuit position or in the off position such that no current will flow and the gun is not operational.

Figure 6:
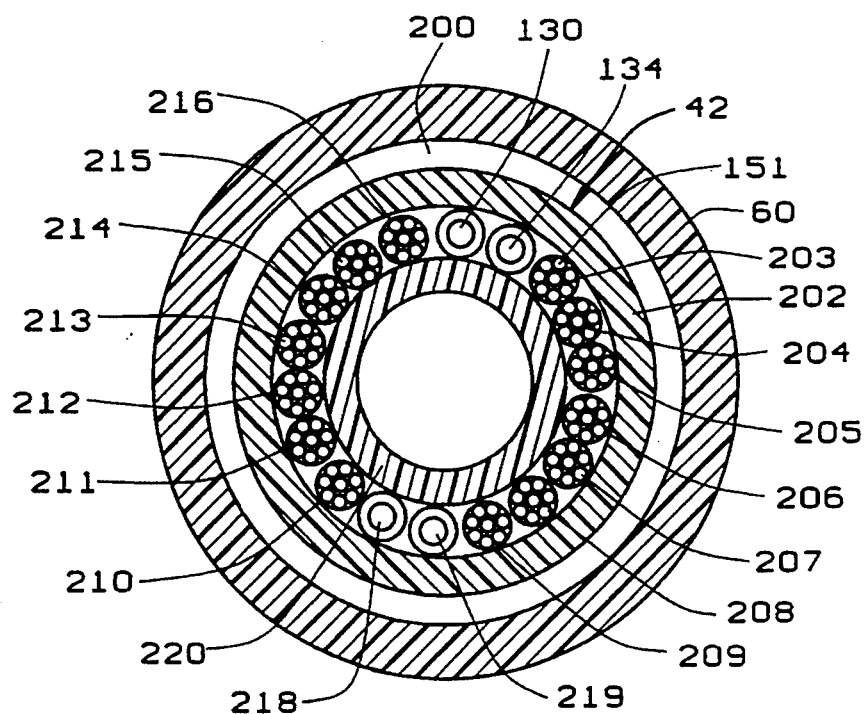
FIG. 6 is a sectional view of the coaxial welding cable taken along line 6—6 of FIG. 3.

FIG. 6 is a section view along the line 6—6 of FIG. 3 of the coaxial cable 42 and the strain relief 60. It should be here appreciated that the sectional cable depicted in FIG. 6 which is a sectional view of the MIG gun 1 of FIGS. 2 and 3, is equally applicable to the smaller MIG gun 150 depicted in FIGS. 4 and 5. However, in MIG gun 150 of FIGS. 4 and 5 the coaxial cable has only one pair of control wires and no auxiliary wires. The strain relief 60 is formed from a thick elastomeric material, which is also an electrical insulator, to provide support to the coaxial welding cable 42. There is an annular gap 200 between the inside diameter of the strain relief 60 and the outside diameter of the coaxial welding cable 42.

The design of the coaxial welding cable 42 as shown in this figure is generally accepted by the industry and is used on most MIG welding systems. The exterior insulating sheath 202 is formed from a flexible insulating material such as neoprene. Underneath the outer insulating sheath 202 is copper stranding 151 which is composed of a plurality of copper strands 203, 204, 205, 206, 207, 208, 209, 210, 211, 212, 213, 214, 215 and 216. The number and size of the copper strands is dictated by the amperage rating of the coaxial welding cable 42. Interwoven with the copper stranding 151 is a first control wire 130 and a second control wire 134. These control wires connect to the trigger switch 94 which is actuated by the trigger 84 to energize the welding gun 1.

The coaxial welding cable 42 may also have additional control wires 218 and 219 which also run the length of the coaxial cable 42. Underneath the copper stranding 151 is a gas feed tube 220, which is also typically formed from neoprene. Inside the gas feed tube 220 is the welding wire feed tube 196, not shown in this view. Shielding gas passes through the annular area between the inside diameter of the gas feed tube 220 and the outside diameter of the welding wire feed tube 196.

A welding wire feed tube 296 and 220 is formed from helically wound metal wire and serves as the conduit for the welding wire 24 respectively in the MIG guns 1 and 150. Those skilled in the art will recognize that a tetrafluoroethylene tube is sometimes substituted for the helically wound metal tube. The welding wire feed tube 196 or 220 runs from the rear connector through the coaxial welding cable 42 and through the respective welding gun 1 or 150. The welding wire feed tube can be removed and replaced, if it wears out or becomes jammed with welding wire 24.

Referring now to FIG. 7 there is shown a typical prior art nozzle assembly 224 with a typical gas diffuser 230 and contact tip 235. The conductor tube 225 is shown to generally include a rigid interior tube 226 and an outer insulating tube 227, with a welding wire feed tube 228 running longitudinally therethrough. Rigid interior tube 226 terminates in a threaded portion 229 which threadedly receives a threaded end 231 of diffuser 230. Diffuser 230 includes a longitudinal bore 232 through which is received welding wire feed tube 228. As the welding gas flows through conductor tube 225, gas diffuser 230 includes gas passages 233 for allowing the gas to exit and surround diffuser 230. On an end distal threaded portion 231, gas diffuser 230 includes a threaded bore 234 in which is received a threaded portion 236 of contact tip 235. Contact tip 235 includes a longitudinal bore 237 in which welding wire 238 is fed via welding feed tube 228 extends. As shown in FIG. 7, welding wire 238 is in general contact with a workpiece 239 during the welding operation. Radially surrounding contact tip 235 and diffuser 230 is a nozzle cap 240, which is removably attached to conductor tube 235 via an interference fit by insulating members 241 and 242. Nozzle cap 240 protects contact tip 235 and 230 from the user and vise versa, but also defines a chamber for directing the gas from gas passages 233 around contact tip 235 and out. As should be understood from the prior art as depicted in FIG. 7, contact tip 235 is generally threaded into gas diffuser 230 and provides contact for electrical transmission and thermal conductivity at the threads.

As shown in Table 1 below, the typical prior art diffuser, such as a #54A manufactured by Tweco Products, Inc., weighs approximately 0.5 ounces. The #54A diffuser is as shown in FIG. 7. As shown in Table 2 below, the typical prior art contact tip, such as #14-45 manufactured by Tweco Products, Inc., weighs approximately 0.35 ounces. The #14-45 contact tip is as shown in FIG. 7. The #14-45 contact tip was designed to operate with the #54A diffuser.

FIG. 8 is an enlarged section view of the nozzle 78 and an end 250 of the conductor tube 72 distal ball socket joint 106 according to the present invention. A gas diffuser 102 threadably engages the second end 250 of the conductor tube 72. A central bore 252 is positioned along the longitudinal axis of the diffuser 102. An interior shoulder 254 protrudes into the central bore 252 thus defining an upper interior chamber 256 and a lower interior chamber 257. The central bore 252 passes through the interior shoulder 254 allowing communication between the upper interior chamber 256 and the lower interior chamber 257. A first gas passageway 258 and a second gas passageway 259 are formed in the diffuser 102. This plurality of gas passageways allows shielding gas to pass from the upper interior chamber 256 to the exterior of the gas diffuser 494 into the annular area 524.

A contact tip 100 is sized and arranged to fit inside the lower interior chamber 257 of the gas diffuser 102. A dimple or protrusion 260 extends into the lower interior chamber 257 of the gas diffuser 102. The contact tip 100 has a longitudinal bore 262 running from the front end 264 to the rear end 265 of the contact tip 100. The longitudinal bore 262 is relatively narrow and can vary in size depending on the diameter of welding wire 24 which is being used for a particular job.

The conductor tube 72 includes an outer insulating surface 136 and a rigid interior tube 138 which is conductive. An annular area 266 runs the entire length of the conductor tube 72. The welding wire feed tube 196 runs the length of the annular area 266 in the conductor tube 72 and bottoms at the shoulder 268 in the diffuser 102. The welding wire 24 passes through the welding wire feed tube 196 and the longitudinal bore 262 of the contact tip 100 exiting the welding gun as shown in FIG. 8 to contact the workpiece 244.

A spiral channel 270 is cut in the exterior surface of the diffuser 102. The spiral spring 272 is sized and arranged to fit in the channel 270. An o-ring 274 is disposed within an annular channel or groove 275 axially adjacent a shoulder 276 that abuts second end 250 of interior tube 138 when gas diffuser 102 is threadedly secured thereto. On the rear end of the nozzle 78 is an interior insulator 278 and an interior collar 280. The collar 280 is sized and arranged to fit over the diffuser and to rub against the spring 272 creating a mechanical grip between the nozzle 78 and the gas diffuser 102. The nozzle 78 can be easily slipped on and off of the diffuser 102 without the need of tools.

The shielding gas flows through the annular area 266 between the welding wire feed tube 196 and the rigid interior tube 138. The gas enters the longitudinal bore 252 of the diffuser 102, passes through the upper interior chamber 256 and exits through the gas passageways 258 and 259 into the annular area 282 formed between the interior diameter of the nozzle 78 and the exterior diameter of the diffuser 102. The gas then moves down the annular area 282 and exits the nozzle forming a shielding blanket around the welding wire 24 isolating the arc from atmospheric contamination.

Referring additionally to FIG. 14, diffuser 102 is shown in an enlarged front view with spring 270 removed. Lower interior chamber 257 and upper interior chamber 256 are depicted as phantom lines along with inward shoulder 254. As can be discerned, protrusion 260 extends into lower interior chamber 257. FIG. 15 is an end view of the diffuser of FIG. 14 taken along 15—15 thereof. From the view of FIG. 15, one can discern protrusion 260 within lower interior chamber 257, as well as lower annular seating surface 292 of diffuser 102.

The diffuser shown in FIGS. 8–9 and 14 is about 2.5 inches long and weighs about 2.25 ounces compared to the prior art diffuser sold by Tweco Products weighing approximately 0.5 ounces. Various models of diffusers corresponding to the diffuser 102 of FIGS. 8, 9 and 14 are summarized in Table 1 below and have been marketed and sold by Tweco Products for the MIG gun 1 and named "Eliminator". These diffusers have a weight approximately between 2 to 2.3 ounces but in general are in excess of 2.0 ounces. These diffusers thus have an increase in mass over the prior art, and is designed for 450 or 600 amperes.

TABLE 1

| DIFFUSERS | | | | |
|---|---|---|---|---|
| CATEGORY | AMPS | PART NO. | WEIGHT (OZ.) | WEIGHT RATIOS (TIP: DIFF) |
| PRIOR ART | — | 54A | 0.512 | 1.4:1 |
| PAT. APPL. SER. # 07/843,322 | — | — | 2.250 | 4.5:1 |
| ELIMINATOR | 450 | *EL-54 | 2.176 | 3.3:1 |
| | | EL-54-CT | 2.080 | 3.3:1 |
| | | EL 54-CT-H | 2.080 | 3.3:1 |
| | | EL-54-H | 2.112 | 3.3:1 |
| | 600 | EL-56-SW | 2.112 | 3.3:1 |
| | | EL-56-H | 1.984 | 3.3:1 |
| WELDSKILL | | *WM-53 | 1.088 | 4.9:1 |

Figure 16:
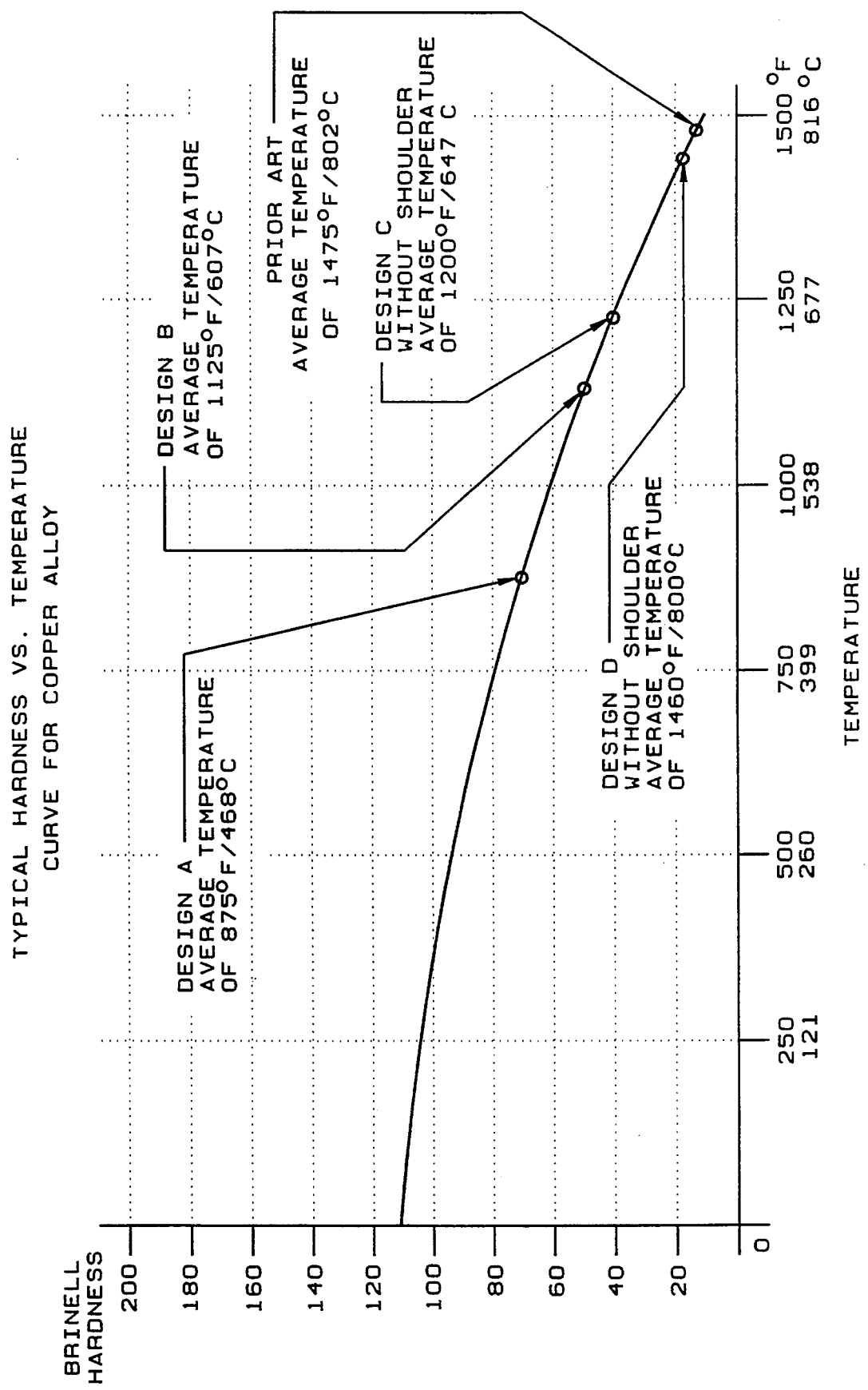
FIG. 16 is a graph of the Brinell hardness versus temperature curve for the copper alloy as utilized in the contact tips of present invention.

* = actually tested and plotted on the chart of FIG. 16.

FIG. 9 is a section view showing a portion of the conductor tube 72, the nozzle 78, the gas diffuser 102 and the contact tip which has been removed from the gas diffuser 102. Those skilled in the art will recognize that it is desirable to have a threadless contact tip so that it can be easily removed from the gas diffuser. Weld spatter will sometimes interfere with threads and make removal difficult if not impossible. To this end, the contact tip 100 thus has a flat surface 286 formed near the rear portion 264 thereof. The purpose of the flat surface 286 is to allow the contact tip 100 to freely slip into the lower interior chamber 257 and bypass the protrusion 260. A channel 288 is cut in the circumference of the contact tip 100 to engage the protrusion 260. A circumferential shoulder 290 is cut in the contact tip near the rear portion 264. The shoulder 290 engages the front end 292 of the diffuser 102 when the contact tip 100 is inserted in the diffuser 102.

The contact tip 100 makes physical contact with the diffuser 102 in at least three locations which improves the transmission of electricity and the dissipation of heat. The first area of contact is between the protrusion 260 and the channel 288 where the protrusion 260 engages a point on the channel 288 when the contact tip 100 is inserted therein and rotated. The second area of contact is between the circumferential shoulder 290 and the front portion 292 of the diffuser 102. This is an annular area extending the full circumference of shoulder 290 and the end 292 of diffuser 102. The third area of contact is a line opposite the protrusion 260 formed by the line of contact between the lower interior chamber 282 and an outer portion of the contact tip 100. This line of contact runs along the outer edge of the contact tip 100 from the shoulder 290 to the rear portion 264.

The channel 288 has a maximum width which is shown by the bracket A in FIG. 9 that intersects the flat surface 286 or is axially disposed below flat surface 286 towards end 265. Channel 288 tapers to a minimum width which is identified by the bracket B in FIG. 9 which is essentially at a point 180° circumferentially from or diametrically opposite to the larger width A. As can best be seen in FIG. 9, channel 288 upwardly slants towards end 264 as it reduces in width from width A to width B. This creates the axial wedging of contact tip 100 when contact tip 100 is rotated within diffuser 102. Protrusion 260 causes contact tip 100 to axially move upwardly towards shoulder 254 of diffuser 102. This seats shoulder 290 of contact tip 100 against end 292 of diffuser 102.

FIG. 12 is an enlarged elevation view of the contact tip 100. The front end 265 is slightly rounded and the rear portion 264 is flat. The shoulder 290 is cut along the full circumference of the contact tip 100 near the rear portion 264. Applicants have successfully used a shoulder which is approximately 3/20 inch wide. A flat surface 286 is cut on the contact tip 100 near the rear portion 264 to allow the entire tip to slip freely in and out of the lower interior chamber 282 past the protrusion 260. The flat surface 286 is tangential to the generally cylindrical tip 100. The channel 288, which is formed in the contact tip 100 near the rear portion 264, must be sized and arranged to receive the protrusion 260. To insert the contact tip 100 into the gas diffuser 102 the flat surface 286 must be aligned with the protrusion 260. The contact tip 100 will then freely slip into the lower interior chamber 282. The protrusion 260 should thus be aligned with the channel 288. The contact tip is then twisted approximately ¼ of a revolution in either direction which wedges the protrusion 260 into the channel 288 and radially forces the contact tip 100 against the opposite side of the lower interior chamber 257 of gas diffuser 102 as well as axially drawing shoulder 290 in contact with the front end 292 of gas diffuser 102.

The shape of the channel 288 and the protrusion 260 are changeable within the present teachings. Those skilled in the art will recognize that other types of protrusions and channels will function in an equivalent fashion. Applicants have successfully used a contact tip 100 for 450 and 600 amperes which weighs approximately 0.5 ounces. The tip is approximately 1.5 inches long and has an outside diameter of approximately ⅜ inch. The aforementioned contact tip 100 is approximately twice as heavy as prior art tips used by Tweco Products, Inc. Applicants believe that the increased mass of the tip together with the improved three points of contact with the respective diffuser described above, allow the present contact tip 100 to operate at cooler temperatures than prior art tips manufactured by Tweco Products, Inc. Applicants believe that the present contact tip 100 has an enhanced operable life because it is believed to operate at cooler temperatures as shown in FIG. 16 and also better to conduct electricity to the contact tip.

Referring to Table 2 below, contact Tip 100 is translated into the "Eliminator" with the designation as Part No. EL16-116. The EL16-116 has a weight of approximately 0.64 ounces which when combined with the 450 amperage and 600 amperage diffusers from Table 1 result in a combined weight of tip and diffuser of 2.76 and 2.69 ounces respectively. Applicants believe that having a combined mass of over 2.5 ounces further results in greater thermoconductivity and electrical transmission, thereby producing an enhanced useable life. This can be seen by the enhanced tip life factor shown in Table 2 for the "Eliminator" tip designs which produces a 6x factor over prior art tips. Referring back to Table 1, diffusers, it can further be seen that a tip to diffuser weight ratio of approximately in the range of 3:1 to 5:1 helps produce this affect. Essentially, applicants have found that by having the combined mass ratio of over 2.5 ounces with the diffuser being heavier than the contact tip, in addition to the three points of contact as described above, produces consumables which have a longer useful life. Thus, with a 450 to 600 amp range make gun, as shown in FIGS. 4 and 5, should have a combined weight tip and diffuser of over 2.5 ounces.

FIGS. 2 and 3. The scale down factor is approximately two-thirds the size. It should here be noted that the nozzle, contact tip and diffuser of FIG. 10, as well as FIG. 11, are shown in scale relative to the nozzle, contact tip and diffuser of FIGS. 8 and 9. This clearly indicates the size difference for the different MIG guns as well as the amperage rating. Likewise, the prior art nozzle, contact tip and diffuser of FIG. 7 is in scale relative to the same of FIGS. 8 and 9, and FIGS. 10 and 11. A conductor tube 334 has an outer insulating tube 336 and an inner rigid tube 338. Inner tube 338 threadedly receives as 340 threaded end 342 of diffuser 332. Diffuser 332 includes a longitudinal bore 344 which extends through an upper interior chamber 346 and a lower interior chamber 348 which is defined by an interior shoulder 350. Lower interior chamber 348 includes a dimple or protrusion 352. Received within lower interior chamber 348 is contact tip 330 which has a longitudinal bore 354 which extends from one end 356 to another end 358. A welding wire 24 extends therethrough and is used to contact work piece 360 during the welding operation. Upper interior chamber 346 includes gas passages 362 and 364 for allowing the gas to pass from the interior of gas diffuser 332 to the exte-

TABLE 2

| CATEGORY | AMPS | TIPS ENHANCED TIP LIFE FACTOR | PART NO. | WEIGHT (OZ.) | COMBINED WEIGHT TIP & DIFFUSER (OZ.) |
| --- | --- | --- | --- | --- | --- |
| PRIOR ART | — | | 14-45 | 0.352 | 0.864 |
| PAT. APPL SER. #07/843,322 | — | | — | 0.500 | 2.75 |
| ELIMINATOR (Design A) | 450 | 6× | *EL16-116 | 0.640 | 2.76 (Avg) |
| | 600 | 6× | EL16-116 | 0.640 | 2.69 (Avg) |
| WELDSKILL (Des B) | — | 2× | *WM14-45 | 0.224 | 1.312 |

* = actually tested and plotted on the chart of FIG. 16.

FIG. 13 is a top plan view of the contact tip 100 along the line 13—13 of FIG. 12. The central bore 262 runs from the rear portion 264 to the front portion 265 of the contact tip 100. The size of the longitudinal bore 262 is determined and varies according to the size of welding wire being used for a given project.

The flat surface 286 is cut on a tangent to the centerline and allows the contact tip 100 to freely pass by the protrusion 260. Those skilled in the art will recognize that other designs would be suitable to allow the contact tip to pass the protrusion 260 and to allow the protrusion 260 to engage the channel 288. The shoulder 290 is relatively narrow but it protects the lower interior chamber 257 from spatter thus making the tip easier to remove when it is time to be replaced. The channel 288 is shown in phantom. The channel 288 achieves its maximum depth at a point 294 where it contacts the flat 286 and achieves its minimum depth 296 directly opposite the flat 286. This creates a radial wedging of contact tip 100 when it is rotated within diffuser 102 as protrusion 260 forces contact tip 100 to radially move due to the depth difference in channel 288 since protrusion 260 is constrained to track within channel 288.

Figure 10:
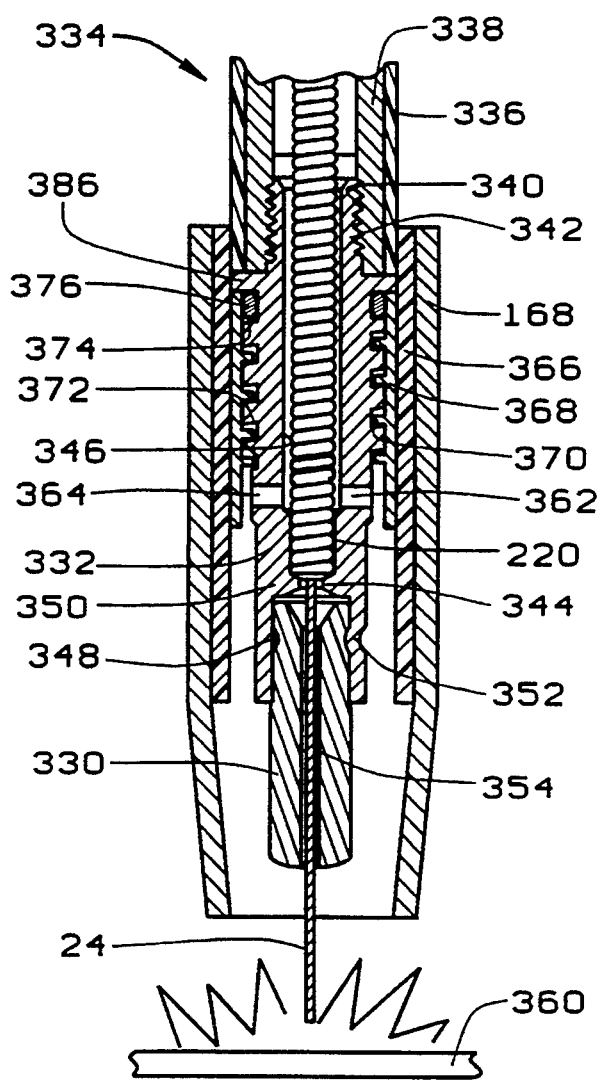
FIG. 10 is an enlarged sectional view of the conductor tube assembly of the MIG welding gun of FIG. 4 utilizing the present diffuser and contact tip in operation with a welding wire feeding through the contact tip and engaging a workpiece.
Figure 11:
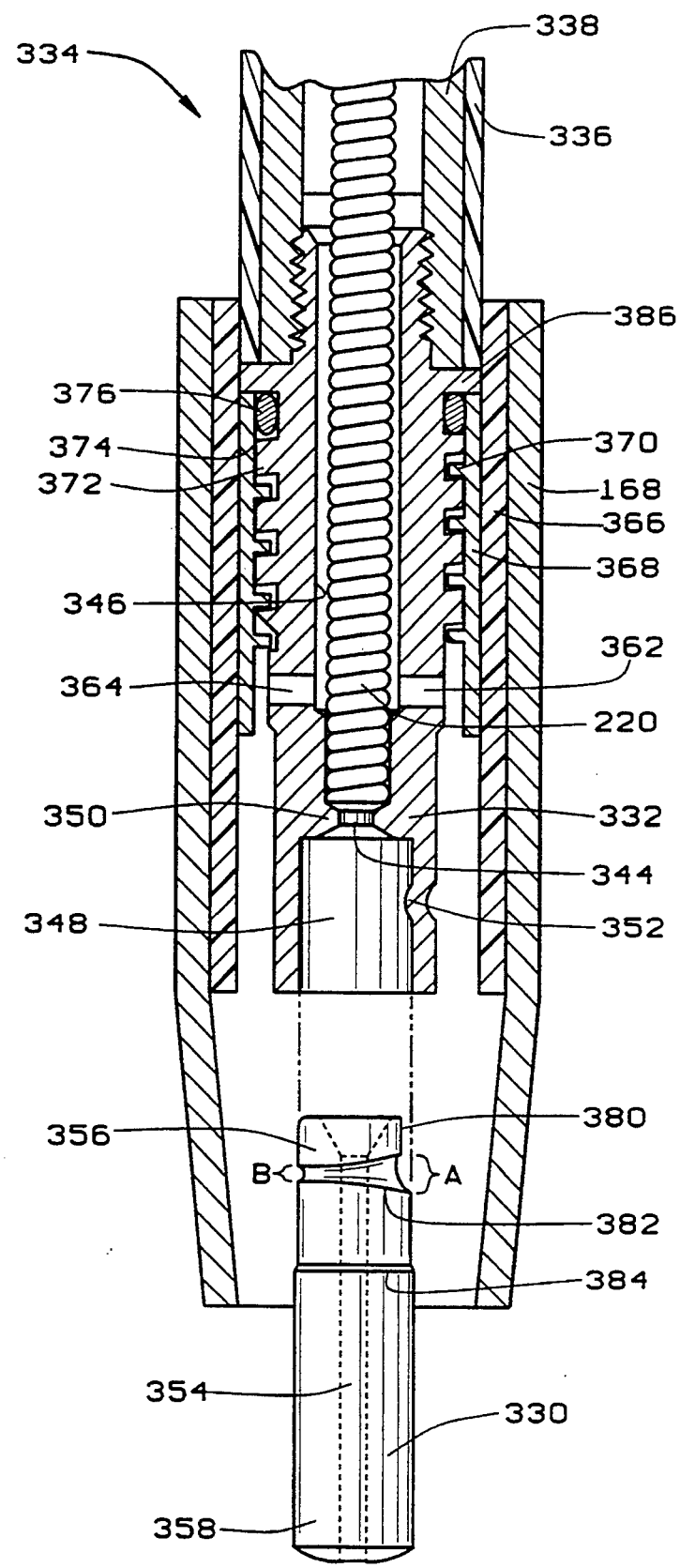
FIG. 11 is an enlarged sectional view of the conductor tube assembly of FIG. 10, except the contact tip has been disconnected and removed from the diffuser.

Referring now to FIG. 10, there is shown an enlarged sectional view of the MIG gun 150 of FIGS. 4 and 5. This MIG gun is a lower amperage gun than the MIG gun of FIGS. 2 and 3, and is designed to operate in the range of around 350 amperes or less. This will be sold by Tweco Products under the name WeldSkill. Essentially, the tip 330 and diffuser 332 are scaled down versions of the tip 100 and diffuser 102 of MIG gun 1 of rior thereof.

Nozzle 168 includes an inner insulating sleeve 366 with a radially inward annular collar 368. Collar 368 includes a plurality of protrusions or threads 370 which threadingly mate with a thread 372 in the outer circumference of diffuser 332. Thus, unlike the nozzle of FIGS. 8 and 9 which is an interference fit, the nozzle of FIGS. 10 and 11 screws on to diffuser 330. Disposed axially below an upper shoulder 386 of diffuser 330 is an o-ring 376 within an o-ring groove 374 defined in the outer circumference of the diffuser 330.

Referring to FIG. 11, the nozzle assembly of FIG. 10 is shown with the exception of the contact tip 330 removed from lower interior chamber 348 of diffuser 332. Contact tip 330 includes a longitudinal bore 354 extending from one end 356 to the other end 358, a tangential flat 380 disposed on end 356, an annular channel 382 formed in the outer circumference of contact tip 330 near end 356, an intersecting flat 380, and an annular shoulder 384. It should here be appreciated that contact tip 330 is essentially the same in form as the contact tip 100 shown at FIGS. 8 and 9 and described here and above. In this regard, the description regarding FIGS. 12 and 13 of contact tip 100 equally apply to contact tip 330 of FIGS. 10 and 11. Thus, channel 382 includes a first width A intersecting flat 380 and a second width B formed radially diametrically opposite with A. Furthermore, channel 382 defines a varying depth going from a first depth adjacent flat 382 to a lesser second depth radially diametrically opposite or 180° radially from flat 380 and the first depth. Furthermore, the form, function, and description of gas diffuser 332 is essentially identical to the gas diffuser 102 depicted in FIGS. 8, 9, 14 and 15, with the exception of the spring and connection of the nozzle. Thus, the description of the operation thereof and flow of gas there through is likewise essentially identical. Gas diffuser 332 is thus a scaled down version of gas diffuser 102, essentially two-thirds the size.

Referring to Table 1 above, the gas diffuser of FIGS. 4, 5, 10 and 11 is labeled the WeldSkill, and referring to Table 2, the contact tip 330 of FIGS. 4, 5, 10, and 11 is likewise labelled the WeldSkill. It can be seen that the diffuser weight is greater than the contact tip weight but is within the tip to diffuser weight ratio of 3:1, with each being larger in mass than the prior art tips.

Referring to FIG. 16, there is shown a graph of the temperature versus hardness for the copper alloy that applicants have successfully used in the various present contact tips 100 and 330. The alloy consists of approximately 99.9% copper and 0.02% phosphorous. The Brinell hardness was found via a testing machine which prints a dent in the material and gives a reading for hardness, then a Rockwell F scale converts that to a Brinell hardness. A zero point on the X axis representing Temperature was calculated by testing and plotting the alloy at essentially room temperature. The melting point which is not shown was calculated for a temperature which gives the zero point on the Y axis representing the Hardness, since at the melting point the copper is liquid and therefore has no hardness. The various designs were then tested to yield the points and thus the curve depicted in FIG. 16.

The point labelled Design A, equates to the contact tip 100 of the "Eliminator" as shown by the asterisk in Table 1, whereas the point labelled Design B corresponds to the WeldSkill designated by the asterisk, whereas the prior art was a tip as shown in prior art FIG. 7. Design C was a Design A, an "Eliminator" tip, essentially the same tip but without the circumferential shoulder, and Design D was a Design B, a "Weldskill" but without the circumferential shoulder. As can be seen from the difference in data points, the elimination of the circumferential shoulder greatly increases the operating temperature of the tip, and thus reduces the operating life.

The test procedure used to measure the tip temperatures for Design A, Design B, Design C, Design D, and the prior art in the respective MIG guns is as follows. The MIG guns were mounted on a robotic welding system and the system was programmed to operate continuously for 30 minutes at specified welding amperages. A temperature sensing device (thermocouple) was mounted on the respective MIG guns such that the temperature of the tip could be accurately measured. The thermocouple was inserted through a hole in the nozzle so that the temperature sensing end of the thermocouple was firmly abutting the tip. The contact point on the tip was at the mid point (½ length). Most MIG weldings occur in the 250 to 350 amperage range at a duty cycle lower than 60%. The duty cycle is defined as a number of minutes of continuous weld time divided by 10 minutes. Thus, a 60% duty cycle is 6 minutes of continuous welding followed by a 4 minute non-welding period of time. If the welding time is 10 minutes or greater, it is defined as 100% duty cycle. The amount of welding in the 150 to 250 amp range and 350 to 450 amp range is somewhat less than the MIG welding in the 250 to 350 amp range. The amount of MIG welding below 150 amps and greater than 450 amps is significantly lower than the 250 to 350 amp range. This test was conducted to determine welding temperatures at or just above the high end of the major welding segment. It was therefore chosen to operate the MIG guns in the 350 and 400 amp ranges using mixed gas. The use of mixed gas (95% argon, 5% oxygen) will cause a higher temperature to be generated at the arc, which in turn will cause a tip to run at a higher temperature. For all types of tips, and MIG guns, three different welding tests were run in the 350 to 400 amp range while each of these tests lasted 30 minutes. Tip temperature is recorded for each test. The maximum recorded temperature for each run was tabulated for each of the three tests. These temperatures were averaged to determined the tip average temperature that is plotted on the Brinell hardness versus temperature curve of FIG. 16.

As can be discern from the chart, prior contact tips manufactured by Tweco Products, Inc. had an average operating temperature of approximately 1475° F. (800° C.). The present contact tip of Design A (Eliminator) is believed to have an average operating temperature of 875° F. (468° C.) which is substantially cooler than the aforementioned prior art tips. Furthermore, Design B (WeldSkill) average temperature of 1125° F. (607° C.) which are all smaller sizes operated less than the operating temperature of the prior art. This chart indicates the general relationship between temperature and hardness for this copper alloy. Generally speaking, the copper alloy tends to get softer as temperature increases. The continuous welding wire feeds through the entire bore of the tip and wears it out. The applicants believe that the present contact tips run cooler and therefore have enhanced properties when compared with the aforementioned prior tips. Applicants believe that the cooler operating temperatures are a result of increase in both the contact tip and diffuser, a combined increase in mass, a certain mass ratio, and improved contact between the respective diffuser and contact tip.

As an example, Design C was a Design A without the shoulder. Thus, there was no additional contact between the shoulder of the contact tip and the end of the diffuser. The test showed that it ran with an average temperature of 1200° F. (647° C.). Applicants thus believe that the enhanced life factor is attributed to the aforementioned differences over the prior art.

What is claimed is:

1. A contact tip and gas diffuser for use with a welding gun using a shielding gas and continuous welding wire comprising:

a. said gas diffuser defining a first interior chamber and a second interior chamber divided by an interior constriction, said interior constriction having a central bore passing therethrough permitting communication between said first interior chamber and said second interior chamber;

b. a plurality of gas passageways in said gas diffuser allowing shielding gas to pass from said first interior chamber to an exterior of said gas diffuser;

c. a protrusion extending into said second interior chamber to engage and removably connect said contact tip;

d. said interior constriction formed in said gas diffuser between said gas passageways and said protrusion;

e. said contact tip being cylindrical and defining a first end and a second end with a longitudinal bore extending from said first end to said second end, said first end of said contact tip sized and configured to register and be held in place in said second interior chamber during operation of the welding gun:
f. a tangential flat surface formed on said first end of said contact tip allowing said contact tip to freely slip into said second interior chamber of said gas diffuser, avoiding said protrusion;
g. a circumferential shoulder formed on said contact tip between said first and second ends and adapted to abut a circumferential end of said second interior chamber remote from said interior constriction of said gas diffuser when said contact tip is placed into said second interior chamber; and
h. a circumferential channel cut in an outer circumference of said contact tip through said tangential flat surface, said circumferential channel having a first width and a first depth intersecting said tangential flat surface and circumferentially tapering to a second width and a second depth at a point radially diametrically opposite said tangential flat, said circumferential channel receiving said protrusion when said contact tip is rotated in said second interior chamber of said gas diffuser, and as said contact tip is rotated in said second interior chamber said second width and said second depth cause said contact tip to axially and radially wedge within said second interior chamber, and said circumferential shoulder to abut said circumferential end of said second interior chamber.

2. The apparatus of claim 1 wherein said elongate contact tip weighs in excess of 0.5 ounces, and said gas diffuser weighs in excess of 2.0 ounces.

3. The apparatus of claim 1, wherein said elongate contact tip weighs approximately 0.2 ounces, and said gas diffuser weighs approximately 1.0 ounce.

4. The contact tip and gas diffuser of claim 1, wherein said first width is greater than said second width, and said first depth is greater than said second depth.

5. The contact tip and gas diffuser of claim 1, wherein said contact tip and said gas diffuser electrically engage at three points:
a. between said circumferential shoulder of said contact tip and a circumferential end of said second interior chamber of said gas diffuser;
b. between said protrusion of said gas diffuser and a point on said circumferential channel of said contact tip; and
c. between a line on said contact tip opposite said protrusion of said gas diffuser and a line on an inner surface of said second interior chamber of said gas diffuser opposite said protrusion.

6. The apparatus of claim 1, wherein said contact tip and said gas diffuser have a combined weight of between 2.6 and 2.8 ounces.

7. The apparatus of claim 1, wherein said contact tip and said gas diffuser have a combined weight of between 1.2 and 1.4 ounces.

8. A contact tip and gas diffuser for use with a welding gun using a shielding gas and continuous welding wire comprising:
a. said gas diffuser defining an upper interior chamber and a lower interior chamber divided by an interior constriction with a central bore passing through said interior constriction, said lower interior chamber having a circumferential opening in an end opposite said interior shoulder for receiving said contact tip;
b. a plurality of gas passageways in said gas diffuser allowing shielding gas to pass from said upper interior chamber to an exterior of said gas diffuser;
c. a protrusion extending into the lower chamber of said gas diffuser to engage and removably connect said contact tip;
d. said interior constriction formed in said gas diffuser between said gas passageways and said protrusion;
e. said contact tip being generally cylindrical in shape with a central bore running from a first end to a second end for passage of the continuous welding wire; said first end of said contact tip sized and configured to register and be held in place in said second interior chamber during operation of the welding gun;
f. a tangential flat surface formed on said first end of said contact tip allowing said contact tip to freely slip into said lower interior chamber of said gas diffuser, avoiding said protrusion;
g. a circumferential shoulder formed on said contact tip between said first and second ends and adapted to abut a circumferential end of said circumferential opening of said lower interior chamber of said gas diffuser when said contact tip is placed into said lower interior chamber; and
h. a circumferential channel cut in an outer circumference of said contact tip and through said tangential flat surface, said circumferential channel receiving said protrusion when said contact tip is inserted in said opening of said lower interior chamber and wedging said contact tip in place in said gas diffuser and wedging said circumferential shoulder against said circumferential end of said circumferential opening of said lower interior chamber of said gas diffuser for operation of the welding gun.

9. A contact tip and gas diffuser for use with a welding gun using a shielding gas and continuous welding wire comprising:
a. said gas diffuser defining an upper interior chamber and a lower interior chamber divided by an interior constriction with a central bore passing through said interior constriction allowing communication between said upper interior chamber and said lower interior chamber, said lower interior chamber having a circumferential opening in an end opposite said interior shoulder;
b. a plurality of gas passageways in said gas diffuser allowing shielding gas to pass from said upper interior chamber to an exterior of said gas diffuser;
c. a protrusion extending into said lower interior chamber of said gas diffuser to engage and removably connect said contact tip;
d. said interior constriction formed in said gas diffuser between said gas passageways and said protrusion;
e. said contact tip being generally cylindrical in shape with a central bore running from a first end to a second end for the passage of the continuous welding wire, said first end of said contact tip said and configured to register and be held in place in said second interior chamber during operation of the welding gun;
f. a tangential flat surface formed on said first end of said contact tip allowing said contact tip to freely slip into said lower interior chamber of said gas diffuser via said opening, avoiding said protrusion;
g. a circumferential shoulder formed on said contact tip between said first end and said second end, said circumferential shoulder adapted to abut a circumferential end of said circumferential opening of said lower interior chamber of said gas diffuser when said contact tip is placed into said lower interior chamber; and h. a circumferential channel cut in the outer circumference of said contact tip through said flat surface, said circumferential channel receiving said protrusion when said contact tip is rotated in said lower interior chamber of said gas diffuser, wedging said contact tip in place in said gas diffuser and for abutting said circumferential shoulder against an end of said circumferential opening of said lower interior chamber for operation of the welding gun;

i. said contact tip and said gas diffuser electrically engaging at three points;
   i. between said circumferential shoulder of said contact tip and said circumferential end of said circumferential opening of said lower interior chamber of said gas diffuser;
   ii. between said protrusion of said gas diffuser and a point on said circumferential channel of said contact tip; and
   iii. between a line on said contact tip opposite said protrusion of said gas diffuser and a line on an inner surface of said second interior chamber of said gas diffuser opposite said protrusion.

10. A contact tip for use in a welding gun using a shielding gas and continuous welding wire comprising:
    a. an elongate generally cylindrical body having a front end and a rear end;
    b. a longitudinal bore in said body from said front end to said rear end for the passage of the continuous welding wire;
    c. a tangential flat formed on rear end of said body;
    d. a circumferential channel formed near said rear end of said body and intersecting said tangential flat for releasably attaching said contact tip in the welding gun; and
    e. a shoulder formed in the full exterior circumference of said body between said front end and said channel.

11. The apparatus of claim 10 being formed from a copper alloy that includes phosphorous.

12. The apparatus of claim 10 weighing in excess of 0.5 ounces.

13. The apparatus of claim 10 weighing approximately 0.2 ounces.

14. A contact tip for use with a welding gun using a shielding gas and continuous welding wire, the contact tip comprising:
    a. an elongate body defining a first end and a second end;
    b. a longitudinal bore disposed in said elongate body extending from said first end to said second end for receiving the welding wire;
    c. a tangential flat disposed at said first end;
    d. a circumferential shoulder formed in said elongate body between said first end and said second end; and
    e. a circumferential groove formed in said elongate body between said first end and said circumferential shoulder, said circumferential groove having a first width where the groove intersects said tangential flat and circumferentially tapering to a second width at a point radially diametrically opposite said tangential flat.

15. The contact tip of claim 14 wherein said first width is greater than said second width.

16. The contact tip of claim 14, being formed from a copper alloy that includes phosphorous.

17. The contact tip of claim 14, wherein said circumferential groove further has a first depth intersecting said tangential flat and circumferentially tapering to a second depth at a point radially diametrically opposite said tangential flat.

18. The contact tip of claim 17, wherein said first depth is greater than said second depth.

19. A contact tip for use with a welding gun using a shielding gas and continuous welding wire, the contact tip comprising:
    a. an elongate body defining a first end and a second end;
    b. a longitudinal bore disposed in said elongate body extending from said first end to said second end;
    c. a tangential flat disposed at said first end;
    d. a shoulder formed in the full exterior circumference of said elongate body between said first end and said second end; and
    e. a circumferential groove formed in said cylindrical body between said first end and said shoulder, said circumferential groove having a first depth intersecting said tangential flat and circumferentially tapering to a second depth at a point radially diametrically opposite said tangential flat.

20. The contact tip of claim 19, herein said first depth is greater than said second depth.

21. The contact tip of claim 19 being formed of a copper alloy that includes phosphorous.

* * * * *